United States Patent [19]
Richter

[11] Patent Number: 6,135,408
[45] Date of Patent: Oct. 24, 2000

[54] MOBILE TELEPHONE HOLDER

[76] Inventor: Herbert Richter, Drosselweg 8, 75331 Engelbrand, Germany

[21] Appl. No.: 09/336,544

[22] Filed: Jun. 19, 1999

[51] Int. Cl.⁷ ...................................................... A47G 1/17
[52] U.S. Cl. .................................... 248/309.4; 248/309.1; 248/206.5; 248/205.1; 248/314; 248/207; 379/446; 379/454; 379/426; 224/929; 224/483; 224/547; 224/183
[58] Field of Search .............................. 248/309.4, 309.1, 248/206.5, 205.1, 314, 207; 379/446, 455, 454, 426, 447; 224/929, 483, 547, 183, 271

[56] References Cited

U.S. PATENT DOCUMENTS

| | | |
|---|---|---|
| D. 406,592 | 3/1999 | Richter ................................... D14/253 |
| 5,230,016 | 7/1993 | Yasuda ........................................ 379/58 |
| 5,392,350 | 2/1995 | Swanson .................................. 379/446 |
| 5,988,572 | 11/1999 | Chivallier et al. ............... 248/220.1 X |
| 5,992,807 | 11/1999 | Tarulli ................................... 248/206.5 |

*Primary Examiner*—Anita M. King
*Assistant Examiner*—A. Joseph Wujciak
*Attorney, Agent, or Firm*—Klaus J. Bach

[57] ABSTRACT

In a holder for an object, such as a mobile telephone, comprising a housing having a front part with a front wall and a rear part with a rear wall and a permanent magnet disposed in the housing adjacent the front wall thereof, the front wall has a recess formed therein and an iron plate having a shape so as to be fittingly received in the recess and having adhesive means at one side thereof is provided for attachment of the plate to an object to permit placing of the object on the holder with the iron plate mounted thereon and received in the recess for locating and holding the object on the holder.

5 Claims, 3 Drawing Sheets

MOBILE TELEPHONE HOLDER

BACKGROUND OF THE INVENTION

The invention relates to an object holder, particularly a mobile telephone holder, which may be mounted, for example, in a car at a conveniently accessible location so that a mobile phone supported on the telephone holder is readily available.

There are various types of such telephone holders. U.S. Pat. No. 5,788,202 discloses a telephone holder with side walls between which the telephone is engaged.

D 406 592 shows a magnetic telephone holder including a housing with foam rubber top layer for supporting a telephone. The housing includes a magnet, which holds the telephone in engagement with the housing somewhat embedded into the foam rubber top layer so that the telephone remains properly positioned on the housing. To facilitate proper positioning, there is further provided a side wall against which the telephone rests.

In order to be held embedded in the foam rubber layer, the support housing must be larger than a telephone disposed thereon.

However, at times when no telephone is disposed on the telephone holder, the holder takes up unnecessarily a relatively large amount of space and, furthermore, is an unsightly view, for example on the dashboard of a car.

It is therefore the object of the present invention to provide a magnetic telephone holder, which is small and which holds a telephone in a particularly desirable position when placed onto the telephone holder. It should also have an attractive appearance when no telephone is disposed on the holder.

SUMMARY OF THE INVENTION

In a holder for an object, such as a mobile telephone, comprising a housing having a front part with a front wall and a rear part with a rear wall and a permanent magnet disposed in the housing adjacent the front wall thereof, the front wall has a recess formed therein and an iron plate having a shape so as to be fittingly received in the recess and having adhesive means at one side thereof is provided for attachment of the plate to an object to permit placing of the object on the holder with the iron plate mounted thereon and received in the recess for locating and holding the object on the holder.

Preferably, the recess formed in the front wall has an elongated portion having a predetermined width and length and a superimposed circular portion arranged in the center of the elongated portion and having a diameter greater than the width of the elongated portion and two iron plates, a circular plate having a diameter corresponding to the diameter of the circular portion and an elongated iron plate in the shape of the elongated portion are provided, each having adhesive means at one side thereof for attachment of either of the plates the object so as to permit placing the object on the holder with the respective iron plate received in the respective recess area.

With this arrangement, a circular holding plate may be attached to the telephone so that the telephone may assume any angular position on the holder or an elongated plate whereby the telephone needs to assume a particular orientation for it to be properly supported on, and engaged with, the telephone holder.

The invention will be described below in greater detail with reference the accompanying drawings.

DESCRIPTION OF A PREFERRED EMBODIMENT

Figure 1:
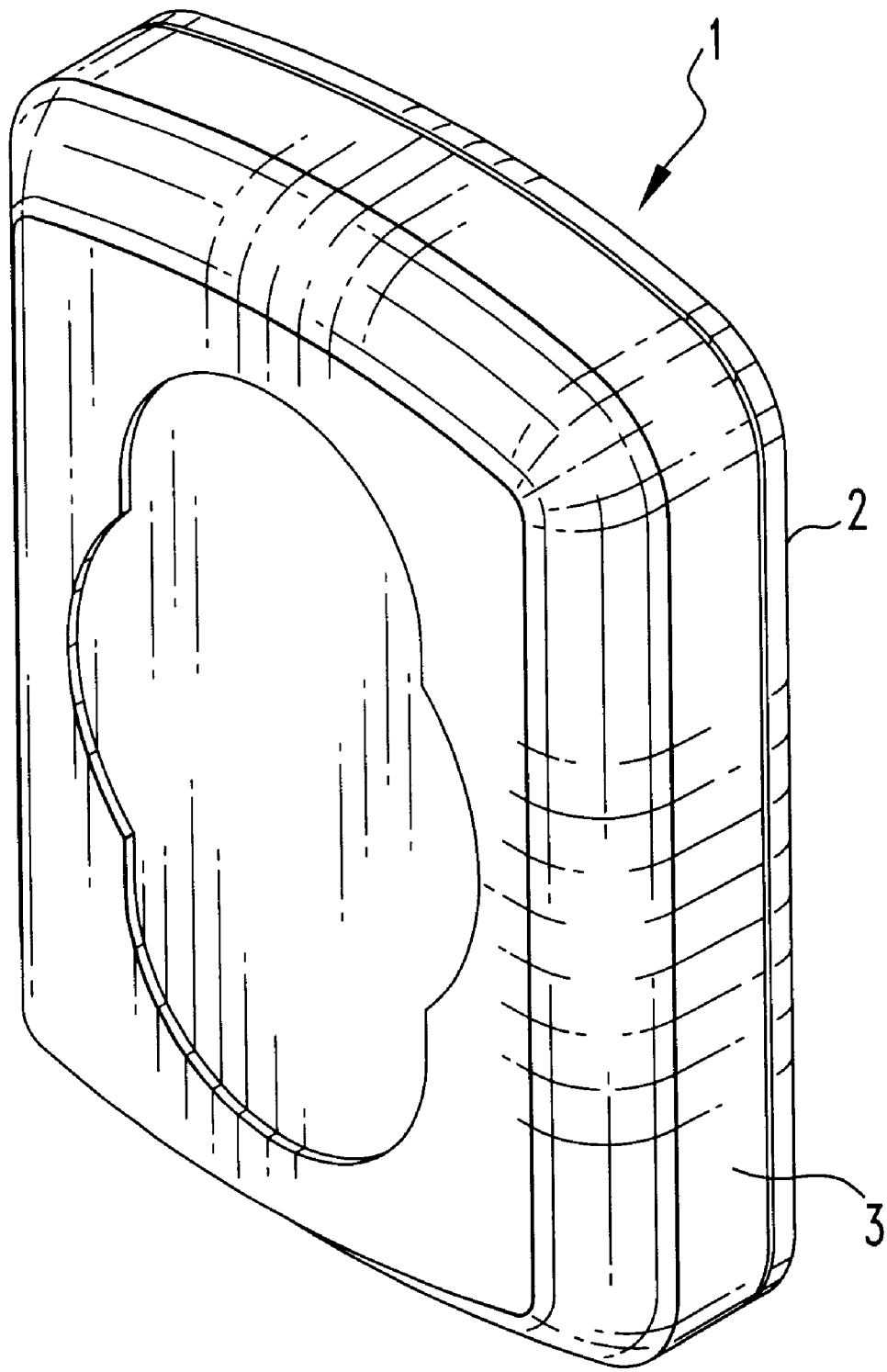
FIG. 1 is a perspective view of the telephone holder according to the invention.
Figure 2:
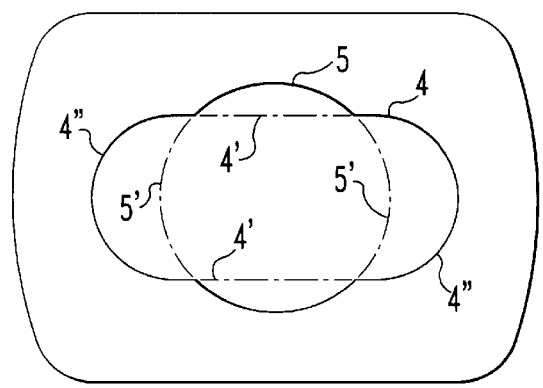
FIG. 2 is a top view of the telephone holder.
Figure 3:
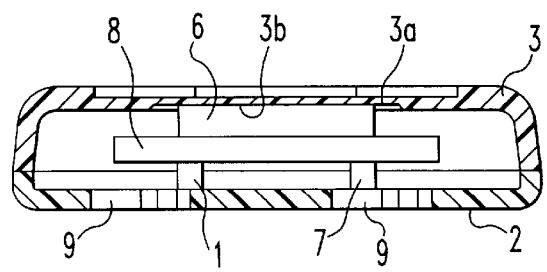
FIG. 3 is a cross-sectional view taken along line III—III of FIG. 4.
Figure 4:
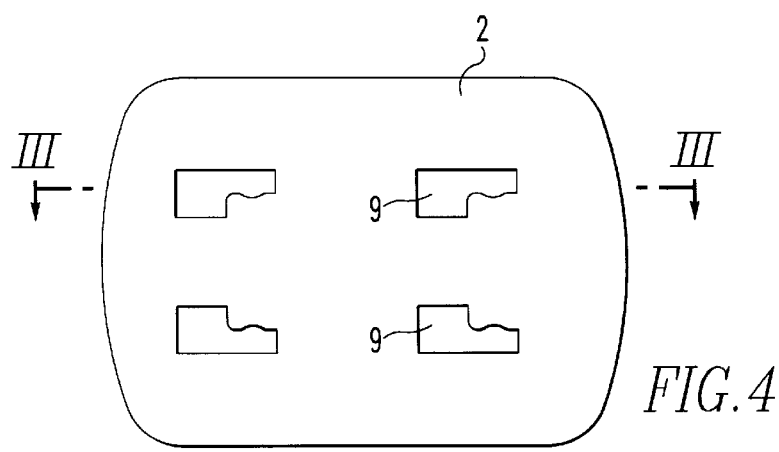
FIG. 4 is a view of the telephone holder showing attachment means.

As shown in FIG. 1, the telephone holder comprises a housing 1 having a rear wall 2 and a front part 3. The front part 3 is provided with a recess 3a having a shape more clearly shown in the top view of FIG. 2. As shown in FIG. 2, the recess 3a comprises an oblong shape 4 superimposed in the center thereof by a circle 5. The oblong shape 4 has been indicated in FIG. 2 by the dashed lines 4' and the circle 5 has been indicated by the dashed lines 5'. The end sections of the oblong shape 4 are formed by semicircles 4". However, other shapes such as rectangular shapes could be used for the end areas.

Enclosed in the housing 1 between the rear wall 2 and the front part 3 is a permanent magnet 6 backed by an iron disc 8 and held in engagement with the wall of the front part 3 by web structures 7 extending from the rear wall 2. Preferably, the front part 3 has an internal recess 3b receiving and locating the magnet 6. The iron disc 8 disposed behind the magnet 6 has a diameter greater than that of the magnet 6 so as to increase the magnetic forces generated by the magnet 6 by providing a path for the magnetic force lines.

The rear wall 2 of the housing includes a mounting structure, which may comprise engagement openings 9 of the type described in applicants U.S. Pat. No. 5,740,995. The openings 8 receive engagement members of a support structure as shown for example in design patent (appl. Ser. No. 29/097073), but other mounting structures such as adhesive layers may be used.

Figure 6:
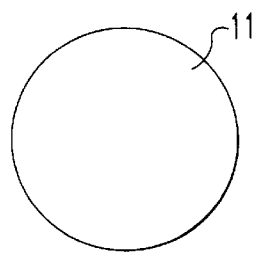
Figure 5:
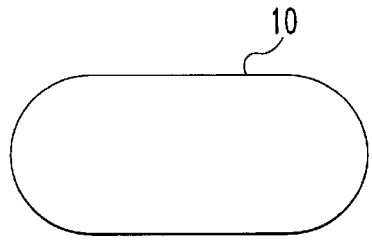
FIG. 5 shows a circular plate for attachment to a telephone, FIG. 6 show an elongated plate for attachment to a telephone to be supported on the telephone holder.

The recess in the front part 3 is adapted to receive either an elongated iron disc 10 as shown in FIG. 5 or, selectively, a round iron disc 11 as shown in FIG. 6.

Figure 7:
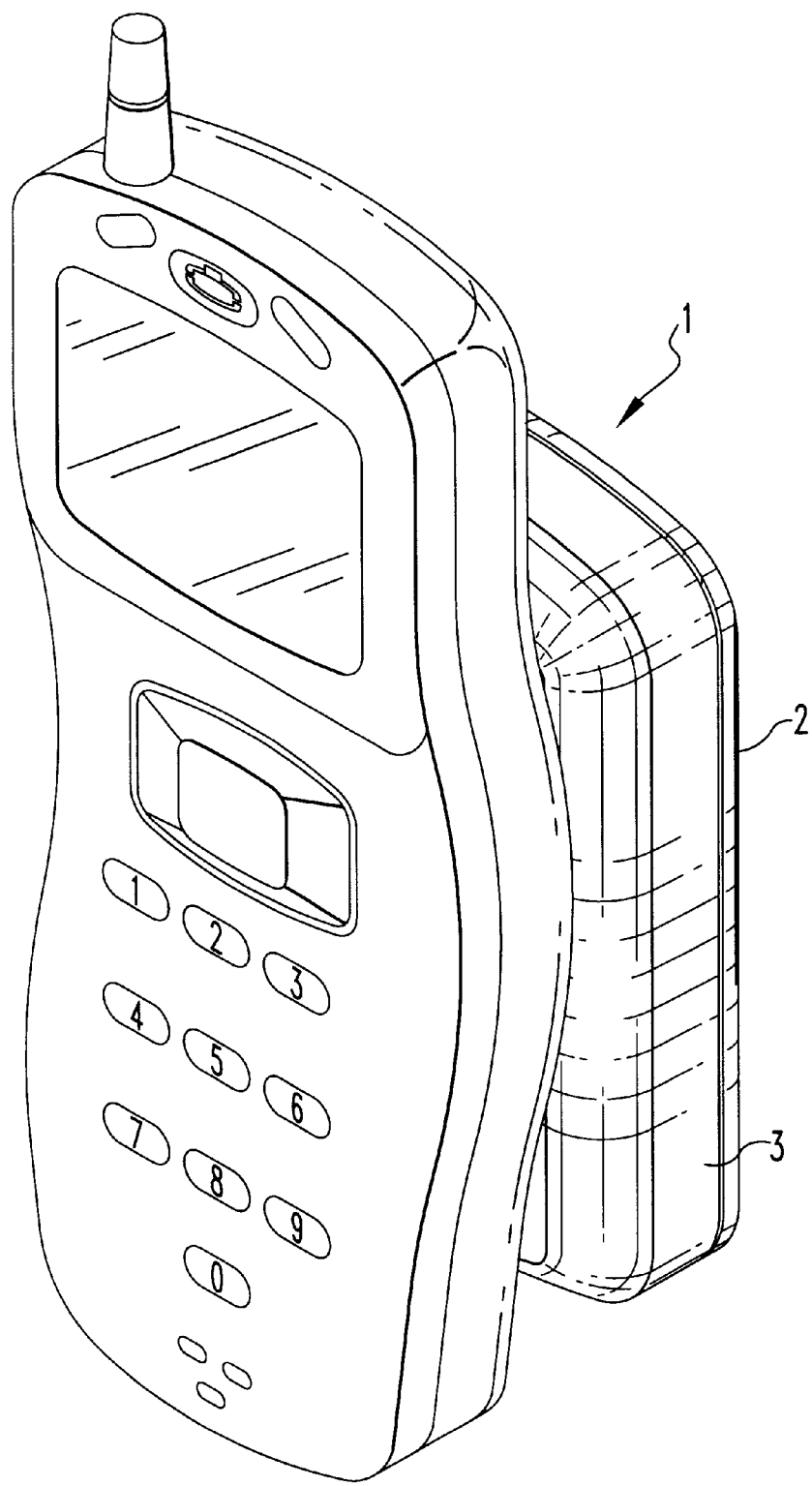
FIG. 7 is a perspective view of the telephone holder with a telephone supported thereon.

The iron discs 10, 11 are provided at one side with a self adhesive layer so that they can be attached to an object, specifically a mobile (cellular) telephone. The object, that is the telephone can then be placed onto the holder 1 such that the iron disc 10 or 11 is received in the recess 4 or 5, respectively, where it is retained by the force of the magnet 6 as shown in FIG. 7.

If the round iron disc 11 is attached to the cellular phone, the phone can be rotated in its place on the holder 1 to an angular position convenient for the user. If the elongated iron disc 10 is attached to the cellular phone, the phone is held in a predetermined position on the phone holder for example in the position as shown in FIG. 7.

Other objects may be attached to the holder in the same manner. For example, a note pad could be provided with the iron disc 10 or 11, preferably with the elongated iron disc 10 for supporting it on the holder 1.

What is claimed is:

1. A holder for an object comprising a housing having a front part with a front wall and a rear part with a rear wall joined together, a permanent magnet disposed in said housing and being fixed between said rear wall and said front wall, said front wall having a recess of a predetermined shape formed therein said recess including an elongated portion having a predetermined width and length and a superimposed circular portion having a diameter greater than the width of said elongated portion, and said rear wall including means for attaching said holder to a support structure, and two iron plates, a circular iron plate having a diameter corresponding to the diameter of said circular portion and an elongated iron plate in the shape of said elongated portion, each of said circular and elongated iron plates including attachment means for mounting selectively either of said iron plates to said object so as to permit placing said object onto said holder with one of said iron plates attached to said object and received in the respective portion of said recess for holding said object on said holder.

2. The holder according to claim 1, wherein said attachment means for attaching said iron plate to said object is an adhesive layer.

3. The holder according to claim 1, wherein said magnet is held in engagement with said front wall opposite said recess and an iron disc of a diameter greater than that of said magnet is disposed behind said magnet.

4. The holder according to claim 3, wherein a web structure is formed on said rear wall to support said iron plate and hold said iron plate in engagement with said magnet and said magnet in contact with said front wall.

5. The holder according to claim 4, wherein said front wall has an internal recess in the shape of said magnet for receiving said magnet and retaining said magnet in position.

* * * * *